United States Patent [19]

Sato et al.

[11] Patent Number: 5,372,895
[45] Date of Patent: Dec. 13, 1994

[54] SOLID OXIDE FUEL CELL AND METHOD FOR MANUFACTURING THE SAME

[75] Inventors: Masaki Sato, Ichikawa; Toshio Arai, Toyama; Takayoshi Yoshimura, Kurobe, all of Japan

[73] Assignee: Yoshida Kogyo K.K., Tokyo, Japan

[21] Appl. No.: 988,733

[22] Filed: Dec. 10, 1992

[30] Foreign Application Priority Data

| Dec. 12, 1991 | [JP] | Japan | 3-328845 |
| Dec. 12, 1991 | [JP] | Japan | 3-328854 |
| Dec. 12, 1991 | [JP] | Japan | 3-328857 |
| Dec. 12, 1991 | [JP] | Japan | 3-328859 |

[51] Int. Cl.$^5$ .............................. H01M 8/24
[52] U.S. Cl. .............................. 429/30; 429/31; 429/32
[58] Field of Search .............................. 429/30, 31, 32

[56] References Cited

U.S. PATENT DOCUMENTS

| 5,151,334 | 9/1992 | Fushimi et al. | 429/32 |
| 5,169,731 | 12/1992 | Yoshimura | 429/30 X |
| 5,173,372 | 12/1992 | Matzuo et al. | 429/31 |

Primary Examiner—Stephen Kalafut
Assistant Examiner—M. Nuzzolillo
Attorney, Agent, or Firm—Flynn, Thiel, Boutell & Tanis

[57] ABSTRACT

A solid oxide fuel cell comprising a hollow dense substrate having a plurality of mounting holes formed in the surface thereof, cell sections mounted in the mounting holes, and interconnections connecting adjacent cell sections, in which each cell section comprises: (1) a flat porous electrode base made of an electrode material for either of an air electrode and fuel electrode, an electrolyte film and the other porous electrode film in order in such a manner that the porous electrode base and the electrolyte film are exposed at one side of the forming surface; or (2) an electrode film made of an electrode material for either of an air electrode and fuel electrode, an electrolyte film, and the other electrode film on a flat porous support base in order in such a manner that the lower electrode film and the electrolyte film are exposed at one side of the forming surface. The cell are manufactured by mounting a plurality of previously-made cell sections in the mounting holes and connecting adjacent cell sections by interconnections.

20 Claims, 8 Drawing Sheets

SOLID OXIDE FUEL CELL AND METHOD FOR MANUFACTURING THE SAME

BACKGROUND OF THE INVENTION

1. Field of the Invention

The present invention relates to a solid oxide fuel cell (hereinafter referred to as an SOFC) for generating electric energy through an electrochemical reaction and also to a method for manufacturing the same.

2. Description of the Prior Art

The following SOFCs are known: a high voltage output type tubular SOFC made by forming a plurality of single cells each comprising a fuel electrode, an electrolyte, an air electrode, and with an interconnection connecting the single cells in series each other on a porous support tube (Japanese Patent Laid-Open No. 73246/1979); a high current output type tubular SOFC made by forming a single cell comprising an inner electrode, an outer electrode, an electrolyte between the electrodes, and with an interconnection formed in a selected section of the inner electrode passing through the electrolyte and the outer electrode on a porous support tube. Each adjacent cell tubes are connected in series as the interconnection of a cell connecting to an outer electrode of an adjacent cell through a metallic felt and/or in parallel as the outer electrodes of adjacent cells connecting each other through a metallic felt (Japanese Patent Laid-Open No. 130381/1982); and a monolithic SOFC made by sandwiching a flat cell section comprising three layers, namely, a fuel electrode, an electrolyte, and an air electrode, between corrugated mutual-connection walls comprising three layers, namely, an air electrode, an interconnection, and a fuel electrode (Japanese Patent Laid-Open No. 100376/1985).

These prior SOFCs, however, have some problems in practical use like the output per volume of the tubular SOFC is not high because the porous support tube cannot be extremely thinned in view of its structure though the tubular SOFC can be comparatively easily manufactured, or the manufacture on the monolithic SOFC, such as cell fabrication, gas-sealing, and assembling, is very difficult though the monolithic SOFC has a good performance of a high output per volume.

In order to solve the above problems, the applicants of the present invention proposed an SOFC whose power generation efficiency is improved by decreasing the necessary strength of a support (porous part or inner electrode) and which can be easily assembled and its manufacturing method in Japanese Patent Application No. 106610/1990.

That is, the SOFC in the previous application is fabricated by arranging inner electrodes in a hollow section in the surface of a substrate using or without using a porous base provided on the surface of the substrate, forming an electrolyte and an outer electrode in order through means such as vapor deposition to form each of single cell sections and connecting them in series and in parallel by interconnections.

However, conventional manufacturing methods have a problem that, if a failure occurs in one cell section under fabricating cells, the whole assembly of cell stacks or cell sections may become defective because a plurality of cell sections are simultaneously manufactured or integrated on the substrate.

Moreover, there is a problem that the base is affected by heat when the film of each element of a cell section is formed because the cell section is formed on the substrate.

SUMMARY OF THE INVENTION

Therefore, it is an object of the present invention to provide a cell section preferable for an SOFC and capable of solving the above problems in manufacturing the SOFCs.

As the result of intensive study, the inventor of the present invention has found that it is effective to form holes in a hollow dense substrate and set previously-manufactured cells in the holes. Thus, the present invention is made.

The present invention is characterized in that previously-made cell sections (1) or (2), shown below, are mounted in mounting holes formed in a surface of a hollow dense substrate.

(1) A cell section for a solid oxide fuel cell comprising a flat porous electrode base made of an electrode material for either of an air electrode and fuel electrode, an electrolyte film and the other porous electrode film in order in such a manner that the porous electrode base and the electrolyte film are exposed at one side of the forming surface.

(2) A cell section for a solid oxide fuel cell comprising an electrode film made of an electrode material for either of an air electrode and fuel electrode, an electrolyte film, and the other electrode film on a flat porous support base in order in such a manner that the lower electrode film and the electrolyte film are exposed at one side of the forming surface.

DETAILED DESCRIPTION OF THE PREFERRED EMBODIMENTS

Figure 1:
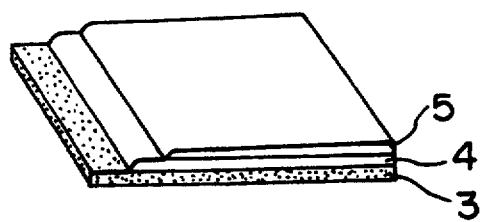
FIG. 1 is a perspective view of a cell section using a porous air electrode base.
Figure 2:
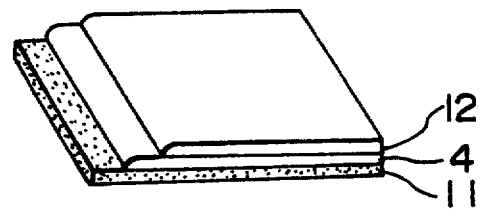
FIG. 2 is a perspective view of a cell section using a porous fuel electrode base.
Figure 3:
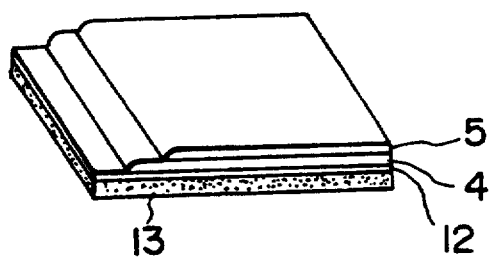
FIG. 3 is a perspective view of a cell section fabricated by forming an air electrode, an electrolyte film, and a fuel electrode in order on a porous support base.
Figure 4:
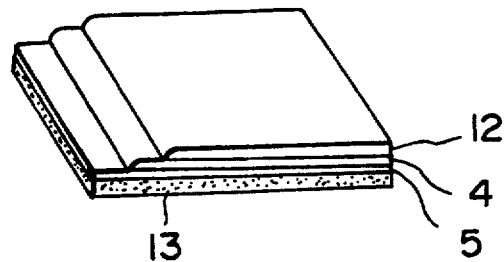
FIG. 4 is perspective view of a cell section fabricated by forming a fuel electrode, an electrolyte film, and an air electrode in order on a porous support base.

A first type of the cell section used for the present invention, as shown in FIGS. 1 and 2, is fabricated by forming, on a porous base made of the electrode material for either a porous air electrode base 3 or porous fuel electrode base 11, an electrolyte film 4 and another electrode film, that is, a fuel electrode film 5 or an air electrode film 12 in order A second type of it, as shown in FIGS. 3 and 4, is fabricated by forming an air electrode film 12 (or fuel electrode film 5), electrolyte film 4, and fuel electrode film 5 (or air electrode film 12) in order on a porous base 13 serving as a support. As shown in FIGS. 1 to 4, the lower layers are exposed at one side of the forming surface in both types. By constituting the cell sections as described above, it is possible to prevent the electrodes in the same cell section from contacting each other when connecting the cell sections by interconnections after integrating them on a substrate.

Figure 5:
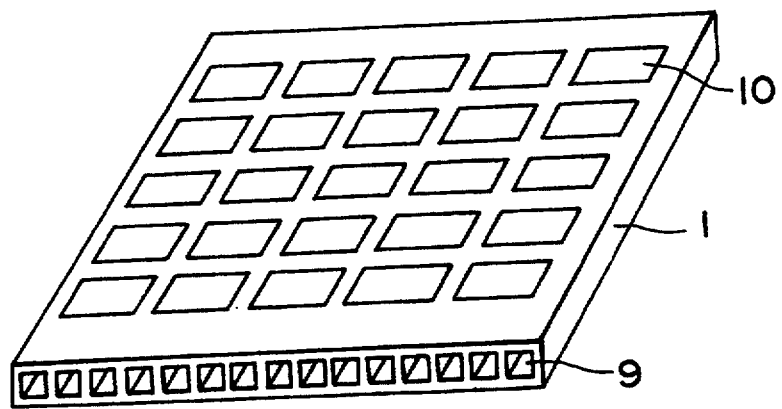
FIG. 5 is a perspective view of a hollow dense substrate having cell section mounting holes and omitting a part of the internal structure.

After the previously-manufactured cell sections 2 are preferably fitted into the predetermined holes 10 on the dense substrate as shown in FIG. 5, adjacent cell-section electrodes are connected by an interconnection in series or in parallel. In FIG. 5, the internal structure is partly omitted. In this case, it is possible to manufacture an SOFC superior in gas sealing characteristic by securing cell sections 2 onto the dense substrate 1 with an adhesive 6 and then forming interconnections 7.

Figure 6:
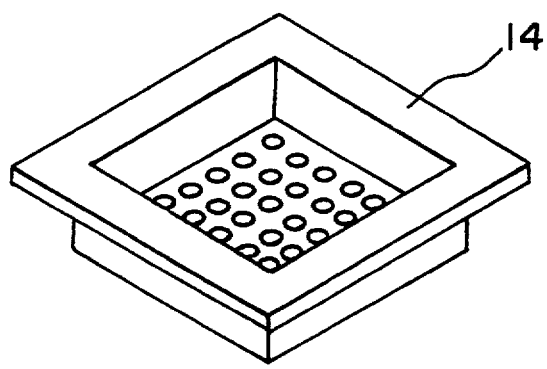
FIG. 6 is a perspective view of a holding member used in the present invention.
Figure 7:
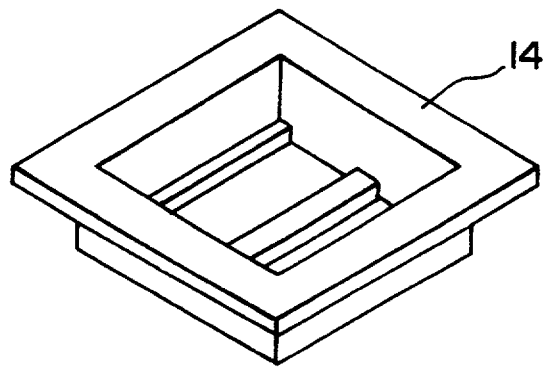
FIG. 7 is a perspective view of another holding member used in the present invention.

It is also possible to secure the cell sections 2 through holding members 14 whose bottoms have a gas permeable structure as shown in FIGS. 6 and 7. The holding members 14 are secured into the mounting holes 10 of the hollow dense substrate 1 by an adhesive 6.

Also, when gas seal films are formed on the fitting portions between the cell sections 2 and mounting holes 10 of the hollow dense substrate 1, it is possible to manufacture an SOFC more superior in the gas sealing characteristic.

Ceramic which is an electrical insulator is preferable for the hollow dense substrate 1 used in the present invention. For example, alumina, magnesia, and mixture thereof are suitable.

Yttira-stabilized zirconia (hereinafter referred to as a YSZ) is suitable for the electrolyte film 4. For the porous electrode bases and electrode films, $LaMnO_3$ and $LaCoO_3$ to which alkaline earth metal are added is suitable for the air electrodes and Ni-zirconia cermet is suitable for the fuel electrodes.

An open-porous ceramic is preferable for the porous base 13 serving as supports. For example, alumina, magnesia, mixture of alumina and magnesia, and stabilized zirconia are suitable. It is more desirable to provide the above materials with an electronic conduction.

The interconnection 7 is a material having an electronic conduction and stable in both an oxidizing atmosphere and reducing atmosphere. Therefore, for example, perovskite-type oxide made by adding alkaline earth metals to $LaCrO_3$ is suitable for it.

Ceramic adhesives 6, such as alumina, silica, and zirconia, which are stabilized and densified in oxidizing or reducing atmosphere are desirable for the adhesive. It is more desirable to provide the adhesives with an electronic conduction. The above holding members 14 comprise each a heat-resisting metal, such as an Ni-based super-heat-resisting alloy. An electrical insulator such as alumina is desirable for the gas seal film 8.

The present invention will be described below by referring to the drawings.

EXAMPLE 1

Figure 8:
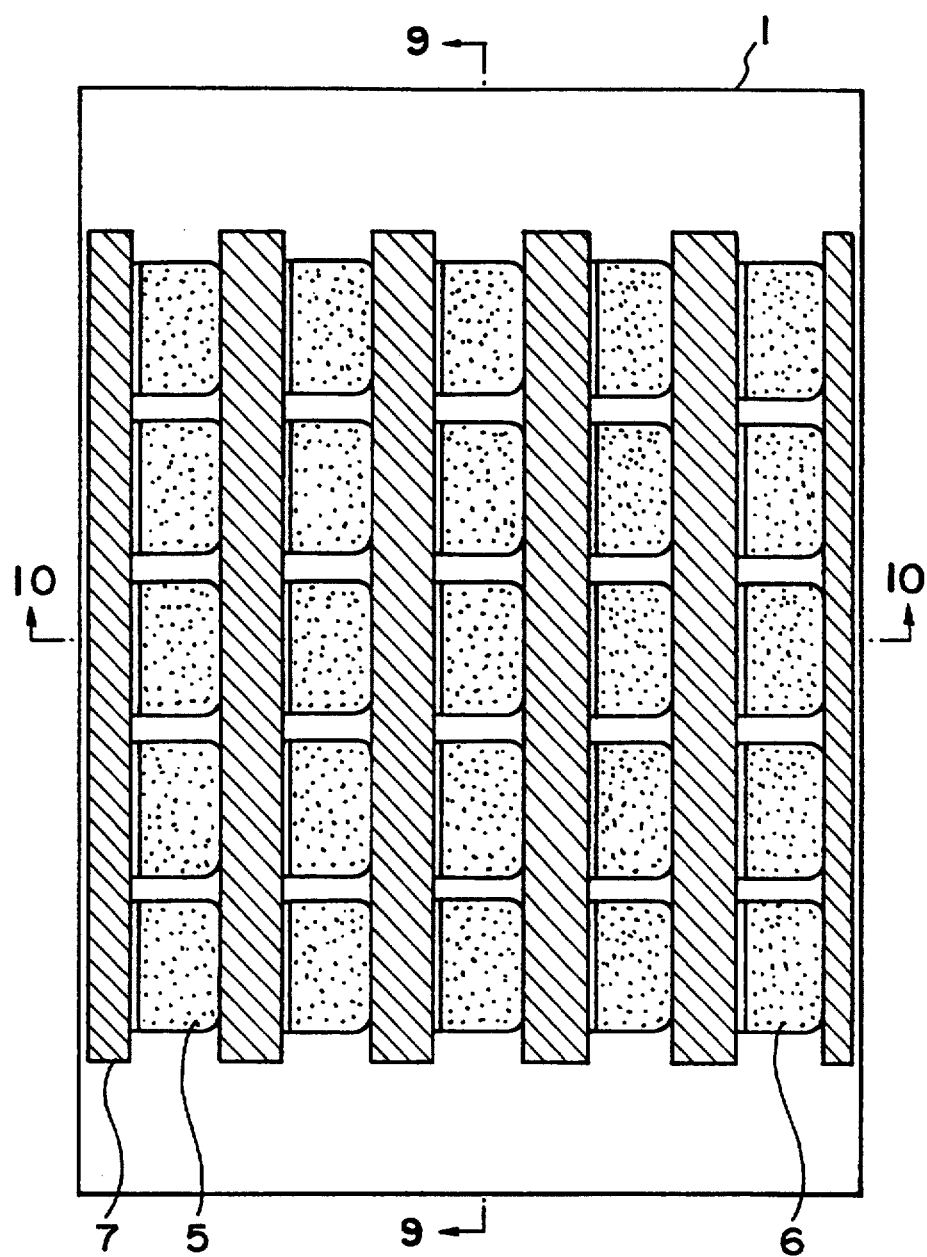
FIG. 8 is a schematic plan view of an SOFC of the first embodiment of the present invention.
Figure 9:
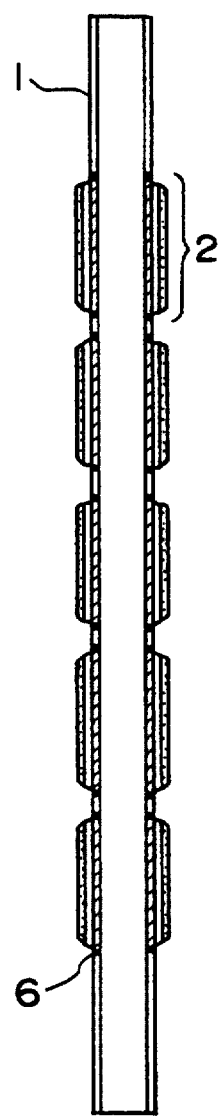
FIG. 9 is a sectional view of the SOFC in FIG. 8, taken along the line Y—Y of FIG. 8.
Figure 10:
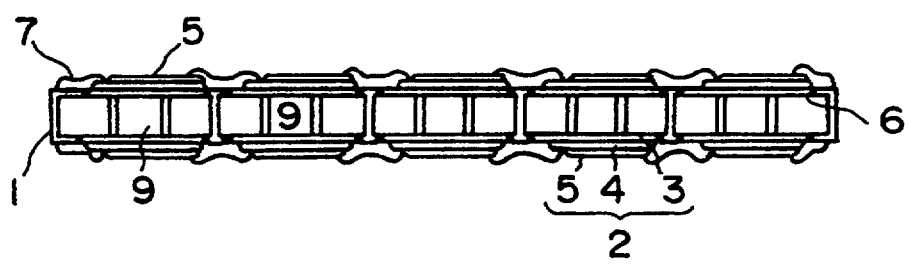
FIG. 10 is a sectional view of the SOFC in FIG. 8, taken along the line X—X of FIG. 8.

FIG. 8 is a schematic plan view of the whole of an SOFC and FIGS. 9 and 10 were sectional views of the SOFC, taken along the lines Y—Y and X—X in FIG. 8.

The dense substrate 1 was made by extrusion pressing alumina and appropriately forming cell-section mounting holes in it and firing it at 1,400° to 1,700° C.

Cell sections 2 were prepared as follows. The porous air electrode base 3 was obtained by forming a green film by a doctor blade method using $La_{0.8}Sr_{0.2}MnO_3$ as its material and cutting it with a cutter, and firing it at 1,200° to 1,500° C.

Then, the electrolyte films 4 were formed by masking the current output parts of the porous air electrode bases 3 and spraying yttria-stabilized zirconia on them by a plasma spraying method.

Then, the cell sections 2 were completed by masking electrolyte films 4, and spraying NiO-YSZ on them by a flame spraying method to form fuel electrode films 5.

A plurality of manufactured cell sections 2 were secured to the cell-section mounting holes 10 of the dense substrate 1 by an alumina-based adhesive 6. In this embodiment, the interconnection 7 were formed by securing twenty five cell sections to one side of the dense substrate 1, masking the dense substrate and spraying $LaMgCrO_3$ on it by a plasma spraying method or flame spraying method, and the cell sections 2 were connected in series and in parallel.

After securing the cell sections 2 to one side of the dense substrate 1, the same operations were applied to the other side to provide an SOFC.

EXAMPLE 2

This example will be described below by referring to FIGS. 11, 12, and 13.

Figure 11:
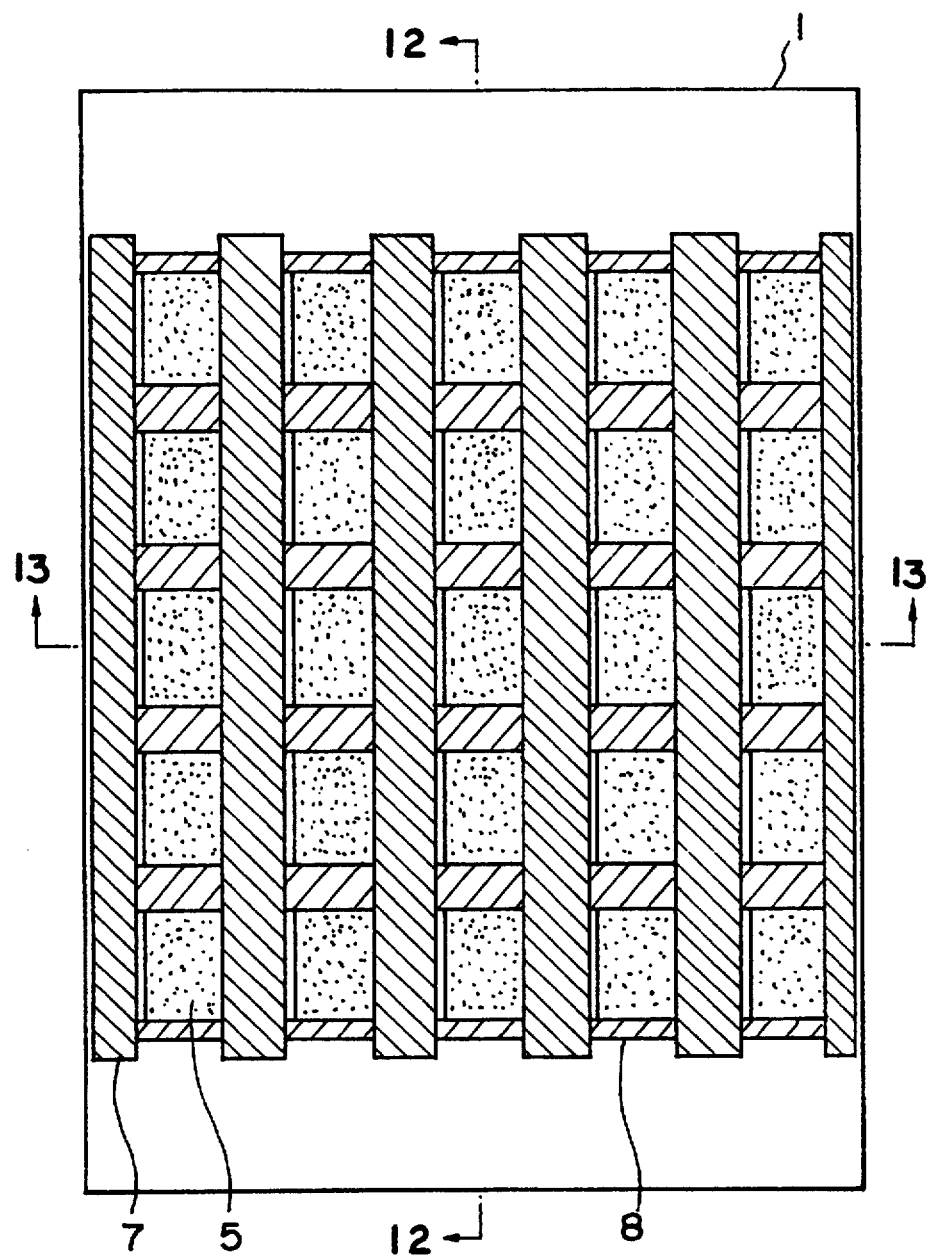
FIG. 11 is a schematic plan view of an SOFC of a further embodiment of the present invention.
Figure 12:
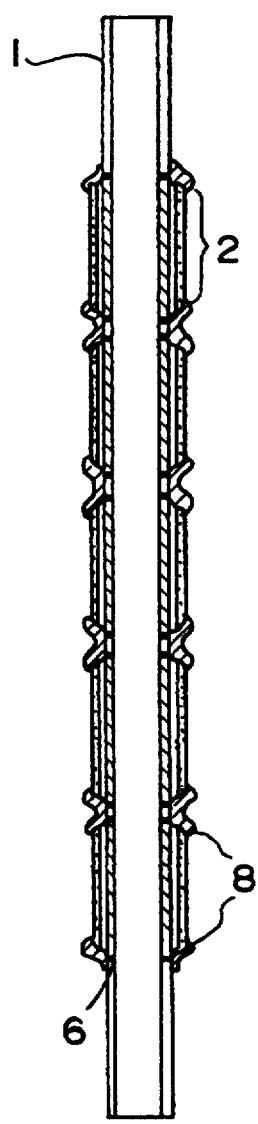
FIG. 12 is a sectional view of the embodiment in FIG. 11, taken along the line Y—Y of FIG. 11.
Figure 13:
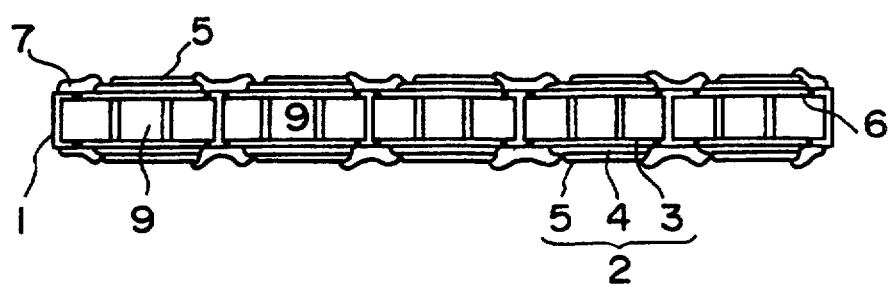
FIG. 13 is a sectional view of the embodiment in FIG. 11, taken along the line X—X of FIG. 11.

FIG. 11 is a schematic plan view of the entire SOFC and FIGS. 12 and 13 are sectional views of the SOFC in FIG. 11, taken along the lines Y—Y and X—X. In FIG. 11, gas sealing films 8 were formed by securing the previously-made cell sections 2 to the dense substrate 1 and, then, spraying alumina on them by the plasma spraying method before forming the interconnections 7. The other materials used and the manufacturing steps were the same as those of the first embodiment.

In the above embodiment, adhesive was used. However, it is possible to manufacture an SOFC by using holding members 14 shown in FIGS. 6 or 7 or both the holding members 14 and adhesive in a way similar to that of Example 1. The same effect is obtained by reversing the forming order of the gas seal films 8 and the interconnections 7 in Example 2. The shapes of the dense substrate 1, cell sections 2, and masks are not restricted to those of the above embodiments. The same effect is obtained by the above manufacturing method even in the case of an SOFC using porous support bases in the cell sections 2 or even when fuel electrodes are provided on the hollow section 9 side.

Electric power could be generated by keeping the SOFCs obtained according to the present invention at about 1,000° C. and supplying oxygen to the hollow sections 9 of the dense substrate 1 and fuel such as hydrogen to the fuel electrode side.

According to the present invention, (1) defective cell sections can be easily removed because they are previously manufactured, and the yield and reliability of the SOFCs can be improved because only non-defective cell sections can be set on a dense substrate, (2) the influence of heat generated in forming the electrode films and electrolyte films on a dense substrate need not be considered and the reliability of the SOFCs can be improved unlike the case in which cell sections are formed on the dense substrate through vapor deposition or spraying method on the spot, because previously-manufactured cell sections are set on the dense substrate, and (3) the manufacturing cost can be lowered because the constitution of cell sections is simple, its mass production is easily realized, and cell sections can be easily mounted on a dense substrate.

What is claimed is:

1. A cell section for a solid oxide fuel cell comprising a flat porous electrode base made of an electrode material for either an air electrode or a fuel electrode, an electrolyte film and a porous electrode film in that order such that the porous electrode base and the electrolyte film are exposed at one or two sides.

2. A cell section for a solid oxide fuel cell section comprising a lower electrode film made of an electrode material for either an air electrode or a fuel electrode, an electrolyte film, and an upper electrode film on a flat porous support base in that order such that the lower electrode film and the electrolyte film are exposed at one or two sides.

3. A method according to claim 2, wherein the holding members are secured into the mounting holes of the hollow substrate by an adhesive.

4. A method according to claim 3, wherein gas seal films are formed on fitting portions provided between the cell sections and mounting holes of the hollow substrate.

5. A method according to claim 2, wherein gas seal films are formed on fitting portions provided between the cell sections and mounting holes of the hollow substrate.

6. A method according to claim 1, wherein the cell sections are mounted in the mounting holes of the hollow substrate by means of an adhesive applied between the mounting holes and the cell sections.

7. A method according to claim 6, wherein gas seal films are formed on fitting portions provided between the cell sections and mounting holes of the hollow substrate.

8. A method according to claim 1, wherein each of the cell sections is manufactured by forming a flat porous electrode base made of an electrode material for either an air electrode or a fuel electrode, an electrolyte film and a porous electrode film in that order, the porous electrode base and the electrolyte film being exposed at one side thereof.

9. A method according to claim 1, wherein each of the cell sections is manufactured by forming a first electrode film made of an electrode material for either an air electrode or a fuel electrode, an electrolyte film, and a second electrode film formed on a flat porous support base in that order, the first electrode film and the electrolyte film being exposed at one side thereof, said first electrode film is an air electrode when said second electrode film is a fuel electrode and said first electrode film being a fuel electrode when said second electrode film is an air electrode.

10. A method according to claim 1, wherein gas seal films are formed on fitting portions provided between the cell sections and mounting holes of the hollow substrate.

11. A solid oxide fuel cell comprising a hollow substrate having a plurality of mounting holes formed in the surface thereof; preassembled cell sections mounted in the mounting holes, and interconnections connecting adjacent cell sections, each of the cell sections comprising a flat porous electrode base made of an electrode material for either an air electrode or a fuel electrode, an electrolyte film and a porous electrode film in that order, the porous electrode base and the electrolyte film are exposed at one side thereof.

12. A solid oxide fuel cell according to claim 11, wherein the cell sections are mounted in the mounting holes of the hollow substrate through holding members made of a heat-resisting material and having a gas permeable structure at its bottom.

13. A solid oxide fuel cell according to claim 12, wherein the holding members are secured into the mounting holes of the hollow substrate by an adhesive.

14. A solid oxide fuel cell according to claim 11, wherein the cell sections are mounted in the mounting holes of the hollow substrate by means of an adhesive applied between the mounting holes and the cell sections.

15. A solid oxide fuel cell according to claim 11, wherein gas seal films are formed on fitting portions provided between the cell sections and mounting holes of the hollow substrate.

16. A solid oxide fuel cell comprising a hollow substrate having a plurality of mounting holes formed in the surface thereof, preassembled cell sections mounted in the mounting holes, and interconnections connecting adjacent cell sections, each of the cell sections comprising a first electrode film made of an electrode material for either an air electrode or a fuel electrode, an electrolyte film, and a second electrode film formed on a flat porous support base in that order, the first electrode film and the electrolyte film being exposed at one side thereof, said first electrode film is an air electrode when said second electrode film is a fuel electrode and said first electrode film being a fuel electrode when said second electrode film is an air electrode.

17. A solid oxide fuel cell according to claim 16, wherein the cell sections are mounted in the mounting holes of the hollow substrate through holding members made of a heat-resisting material and having a gas permeable structure at its bottom.

18. A solid oxide fuel cell according to claim 17, wherein the holding members are secured into the mounting holes of the hollow substrate by an adhesive.

19. A solid oxide fuel cell according to claim 11, wherein the cell sections are mounted in the mounting holes of the hollow substrate by means of an adhesive applied between the mounting holes and the cell sections.

20. A solid oxide fuel cell according to claim 16, wherein gas seal films are formed on fitting portions provided between the cell sections and mounting holes of the hollow substrate.

* * * * *

UNITED STATES PATENT AND TRADEMARK OFFICE
CERTIFICATE OF CORRECTION

PATENT NO. : 5,372,895
DATED : December 13, 1994
INVENTOR(S) : Masaki SATO et al It is certified that error appears in the above-indentified patent and that said Letters Patent is hereby corrected as shown below:

Cancel Claims 1 and 2 and replace with the following:

---1. A method for manufacturing a solid oxide fuel cell, comprising the steps of:
  mounting a plurality of preassembled cell sections in mounting holes formed in the surface of a hollow substrate; and
  connecting adjacent cell sections by interconnections.

2. A method according to Claim 1, wherein the cell sections are mounted in the mounting holes of the hollow substrate through holding members made of a heat-resisting material and having a gas permeable structure at its bottom.---.

UNITED STATES PATENT AND TRADEMARK OFFICE
CERTIFICATE OF CORRECTION

PATENT NO. : 5 372 895
DATED : December 13, 1994
INVENTOR(S) : Masaki SATO et al It is certified that error appears in the above-indentified patent and that said Letters Patent is hereby corrected as shown below:

Col 5.
Claim 5, line 1; change "2" to ---1---.
Col. 6
Claim 10, line 1; change "1" to ---2---.
Col. 6
Claim 19, line 1; change "11" to ---16---.

Signed and Sealed this

Seventh Day of May, 1996

Attest:

BRUCE LEHMAN

Attesting Officer        Commissioner of Patents and Trademarks